United States Patent Office 3,436,398
Patented Apr. 1, 1969

3,436,398
BENZHYDRYLIDENE THIAZOLIDINONES
Martin A. Davis, Montreal, Quebec and David J. Campbell, Pincourt, Quebec, Canada, assignors to American Home Products Corporation, New York, N.Y., a corporation of Delaware
No Drawing. Filed May 23, 1966, Ser. No. 551,884
Int. Cl. C07d 91/16; A61k 27/00; A01n 9/22
U.S. Cl. 260—306.7         5 Claims This invention relates to novel chemical compounds having useful biological properties. More particularly, this invention relates to novel thiazolidinones substituted in position 2 with a benzhydrylidene group. The compounds may be represented according to the following general Formula I:

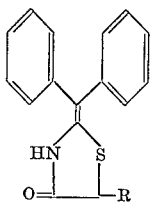

in which R represents hydrogen or a lower alkyl group containing from 1–4 carbon atoms.

The compounds of this invention may be prepared by interacting 2,2-diphenylthioacetamide (obtained conveniently from diphenylacetonitrile and thioacetamide following a general procedure set forth by E. C. Taylor et al. in J. Amer. Chem. Soc., 82 2656 (1960)) with an alpha-halo carboxylic acid ester. Thus, interaction with ethyl bromoacetate furnishes the 4-thiazolidinone of Formula I in which R represents hydrogen. The reaction is advantageously carried out in an inert solvent and at elevated temperature, for example, in boiling chloroform. The product may be isolated by removal of the solvent and purified by recrystallization from an appropriate solvent.

The following formulae, in which R is as defined above, will illustrate this invention.

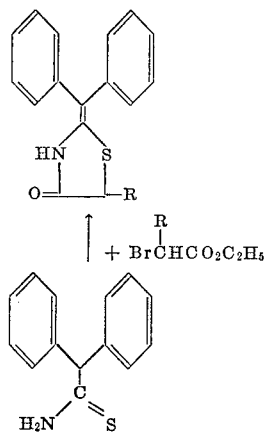

The novel compounds of this invention have important biological properties and are useful as medicaments. They possess larvicidal effects against horse strongyles and may be used to decontaminate premises or pastures which have become infected with members of the Strongylidae family, for example, hookworms, Trichostrongylidae or Metastrongylidae. For such purpose they may be formulated as suspensions in an aqueous vehicle so as to contain from 0.01 to 0.001 mole per litre of the active ingredient. The compounds also possess trichomonicidal activity, especially against Trichomonas vaginalis and are useful as trichomonicidal agents. For this purpose they may be formulated as vaginal inserts or suppositories containing from 50 mg. to 500 mg. of the active ingredient and may be administered twice daily for periods of time of from two to several weeks.

The following descriptive example will illustrate this invention but is not to be construed as limiting it thereto.

Example 1

A solution of 2,2-diphenylthioacetamide (11.4 g., 0.05 mole) and ethyl bromoacetate (9.2 g., 0.055 mole) in chloroform (250 ml.) is heated under reflux for 24 hours. A little insoluble material is filtered off and the filtrate is evaporated. The residue is recrystallized from acetonitrile to yield 2-benzhydrylidene-4-thiazolidinone, M.P. 187–1890° C. Analysis confirms the empirical formula $C_{16}H_{13}NOS$.

In the same manner, but using ethyl 2-bromopropionate, ethyl 2-bromobutyrate, or ethyl 2-bromovalerate, as starting materials, there are obtained the compounds 2-benzhydrylidene-5-methyl-4-thiazolidinone, 2-benzhydrylidene-5-ethyl-4-thiazolidinone and 2-benzhydrylidene-5-propyl-4-thiazolidinone, respectively.

We claim:
1. A compound of the formula

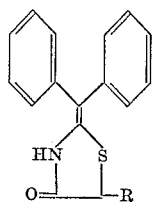

wherein R is selected from the group consisting of hydrogen and lower alkyl containing from 1 to 4 carbon atoms.
2. 2-benzhydrylidene-4-thiazolidinone, as claimed in claim 1.
3. 2-benzhydrylidene-5 - methyl - 4 - thiazolidinone, as claimed in claim 1.
4. 2 - benzhydrylidene - 5 - ethyl - 4 - thiazolidinone, as claimed in claim 1.
5. 2-benzhydrylidene - 5 - propyl - 4 - thiazolidinone, as claimed in claim 1.

References Cited
UNITED STATES PATENTS
3,182,063   5/1965   Satzinger _____ 260—306.7

ALTON D. ROLLINS, Primary Examiner.

U.S. Cl. X.R.
260—551; 424—270